United States Patent
Moon

(10) Patent No.: US 11,945,394 B2
(45) Date of Patent: Apr. 2, 2024

(54) CURTAIN AIRBAG

(71) Applicant: HYUNDAI MOBIS CO., LTD., Seoul (KR)

(72) Inventor: Geon Woong Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/079,128

(22) Filed: Dec. 12, 2022

(65) Prior Publication Data

US 2023/0271585 A1  Aug. 31, 2023

(30) Foreign Application Priority Data

Feb. 25, 2022  (KR) .................. 10-2022-0024972

(51) Int. Cl.
| | | |
|---|---|---|
| *B60R 21/232* | (2011.01) | |
| *B60R 21/213* | (2011.01) | |
| *B60R 21/233* | (2006.01) | |
| *B60R 21/2346* | (2011.01) | |
| *B60R 21/237* | (2006.01) | |
| *B60R 21/16* | (2006.01) | |
| *B60R 21/231* | (2011.01) | |

(52) U.S. Cl.
CPC .......... *B60R 21/232* (2013.01); *B60R 21/213* (2013.01); *B60R 21/233* (2013.01); *B60R 21/2346* (2013.01); *B60R 21/237* (2013.01); *B60R 2021/161* (2013.01); *B60R 2021/23107* (2013.01); *B60R 2021/23308* (2013.01)

(58) Field of Classification Search
CPC ... B60R 21/232; B60R 21/213; B60R 21/233; B60R 21/237; B60R 21/231; B60R 21/2346; B60R 21/23138; B60R 2021/23107; B60R 2021/23308; B60R 2021/23316; B60R 2021/161
USPC ................... 280/728.2, 729, 730.2
See application file for complete search history.

(56) References Cited

U.S. PATENT DOCUMENTS

2020/0324730 A1* 10/2020 Lee ..................... B60R 21/232
2020/0324731 A1* 10/2020 Kang .................... B60R 21/213
(Continued)

FOREIGN PATENT DOCUMENTS

KR        100942220 B1    2/2010

OTHER PUBLICATIONS

Definition of "tap"—Merriam-Webster Dictionary; https://www.merriam-webster.com/dictionary/tap; Aug. 23, 2023.*

*Primary Examiner* — Keith J Frisby
(74) *Attorney, Agent, or Firm* — NovoTechIP International PLLC

(57) ABSTRACT

A curtain airbag is configured to include a sub chamber to simplify a structure of the curtain airbag and to improve deployment performance of an airbag cushion. The curtain airbag includes a main chamber of the airbag cushion fixed to an upper end inside a vehicle body and configured to be deployed downward, the sub chamber of the airbag cushion configured to be deployed from an upper portion of a pillar trim located inside the vehicle body and to allow the main chamber to move toward a central region of a vehicle, and a cushion cover configured to cover the main chamber and the sub chamber while being folded, wherein the sub chamber is folded with an upper end thereof located higher than a folding center of the main chamber.

16 Claims, 8 Drawing Sheets

(56) References Cited

U.S. PATENT DOCUMENTS

2022/0340097 A1* 10/2022 Lee .................... B60R 21/232
2022/0388469 A1* 12/2022 Kang ................... B60R 21/237

* cited by examiner

PRIOR ART

CURTAIN AIRBAG

CROSS-REFERENCE TO RELATED APPLICATIONS

The present application claims priority to Korean Patent Application No. 10-2022-0024972, filed Feb. 25, 2022, the entire contents of which are incorporated herein by reference.

TECHNICAL FIELD

The present invention relates to a curtain airbag configured to include a sub chamber so as to simplify a structure of the curtain airbag and to improve deployment performance of an airbag cushion.

BACKGROUND

An airbag cushion of an airbag is normally folded in an airbag housing, and when a sensor detects a collision signal during a collision of a vehicle, gas is supplied to the airbag cushion from an inflator and the airbag cushion is deployed temporarily, thereby protecting a passenger from a shock of the vehicle.

Recently, in addition to airbags mounted in front of the driver's seat and front passenger's seat and a side airbag unfolded from the side portion of seats to prepare for a side collision, a curtain airbag that is unfolded in a long shape along a window is becoming common.

Meanwhile, the curtain airbag includes an airbag cushion provided along front and rear rows in a long shape, and includes an inflator therein to supply gas into the airbag cushion.

In addition, as shown in FIG. 1, a mounting tab 9 is partially fixed along a longitudinal direction of an airbag cushion 7, and as the mounting tab 9 is fixed to a vehicle body 1, the airbag cushion 7 is fixed to the vehicle body 1.

In addition, an upper end of a ramp 5 is fixed to an inner surface of the vehicle body 1 corresponding to a pillar trim 3 of each of the B pillar and the C pillar of the vehicle, and a lower end of the ramp 5 is formed to surround a lower end of the airbag cushion 7. Accordingly, when the airbag cushion 7 is deployed, the airbag cushion 7 is guided toward an inboard side of the pillar trim 3 by the ramp 5 and is deployed while avoiding the pillar trim 3, thereby improving the deployment performance of the airbag cushion 7.

However, in a conventional curtain airbag, as the ramp is added to avoid the pillar trim and deploy the airbag cushion, due to application of the ramp, there are problems of increase of manufacturing cost and increase of the work man-hours for assembly.

SUMMARY

The present invention has been made keeping in mind the above problem occurring in the related art, and the present invention is intended to provide a curtain airbag, which includes a sub chamber so as to simplify a structure of the curtain airbag and to improve deployment performance of an airbag cushion.

In order to achieve the above objective, according to one aspect of the present invention, there is provided a curtain airbag including: a main chamber of an airbag cushion fixed to an upper end inside a vehicle body and configured to be deployed downward; a sub chamber of the airbag cushion configured to be deployed from an upper portion of a pillar trim located inside the vehicle body and to allow the main chamber to move toward a center space of a vehicle; and a cushion cover configured to cover the main chamber and the sub chamber while being folded, wherein the sub chamber may be folded with an upper end thereof located higher than a folding center of the main chamber.

The sub chamber may be configured to be deployed prior to the main chamber.

A diffuser may be fixed to an inside portion of the airbag cushion; an inflator may be connected to an inlet of the diffuser and gas is introduced into the airbag cushion; and outlets of the diffuser may be respectively arranged at the main chamber and the sub chamber, so that the gas introduced into the diffuser may be distributed into both of the main chamber and the sub chamber.

The inlet of the diffuser may be connected to a first main outlet formed in the main chamber; and the first main outlet may be distributed into and connected to a sub outlet formed in the sub chamber and a second main outlet formed in the main chamber.

The sub chamber may be formed in a longitudinal direction of the main chamber, and be formed into a passage shape of which a first end may be formed to communicate with an edge of the main chamber and a second end may be closed.

A peninsula area of a predetermined area prevented from being filled with gas may be formed between the sub chamber and the main chamber facing the sub chamber; and the peninsula area may be formed into a shape of which a remaining edge excluding one portion may be surrounded by an edge of the sub chamber and an edge of the main chamber.

A first end of a mounting tab may be fixed to the vehicle body; and a second end of the mounting tab may be fixed between the main chamber and the sub chamber.

The sub chamber may be configured to be deployed between an upper end of the pillar trim and the main chamber while pushing the main chamber toward a center space of the vehicle, so that the main chamber may be prevented from being caught by the upper end of the pillar trim.

The main chamber may be configured to be folded into a roll shape; and the sub chamber may be configured to be folded in a shape of surrounding the main chamber at a lower end of the main chamber toward the center space of the vehicle.

A folded portion formed at an end of the sub chamber may be configured to be folded toward the main chamber.

The sub chamber may be configured to be deployed toward the center space of the vehicle while pushing an inside portion of the vehicle body, so that the main chamber may be prevented from being caught by an upper end of the pillar trim.

The main chamber may be configured to be folded into a roll shape; and the sub chamber may be configured to be folded into a shape of surrounding the main chamber from a lower end of the main chamber toward the inside portion of the vehicle body.

A folded portion formed at an end of the sub chamber may be configured to be folded toward the main chamber.

A folded portion formed at an end of the sub chamber may be configured to be folded toward the inside portion of the vehicle body.

With a fixed portion between the mounting tab and the airbag cushion located higher than a folding center of the main chamber, the curtain airbag may be folded.

As described above, the present invention is configured to improve the deployment performance of the airbag cushion with the sub chamber and, specifically, since the conventional ramp structure for deploying the airbag cushion while avoiding the pillar trim is unnecessary, the manufacturing cost of the curtain airbag module is reduced and the work man-hours for assembly of the ramp can be prevented from increasing.

Furthermore, as the uppermost end of the sub chamber is located higher than the folding center of the main chamber, in the structure in which the sub chamber is folded toward the center space of the vehicle, the sub chamber is deployed at the upper end of the pillar trim to prevent the main chamber from interfering with the pillar trim, and in the structure in which the sub chamber is folded toward the vehicle body, in the process in which the sub chamber is deployed while pushing the vehicle body, the main chamber is more definitely pushed toward the center space of the vehicle and is prevented from interfering with the pillar trim, so that the deployment performance of the airbag cushion can be improved.

DETAILED DESCRIPTION

Figure 1:
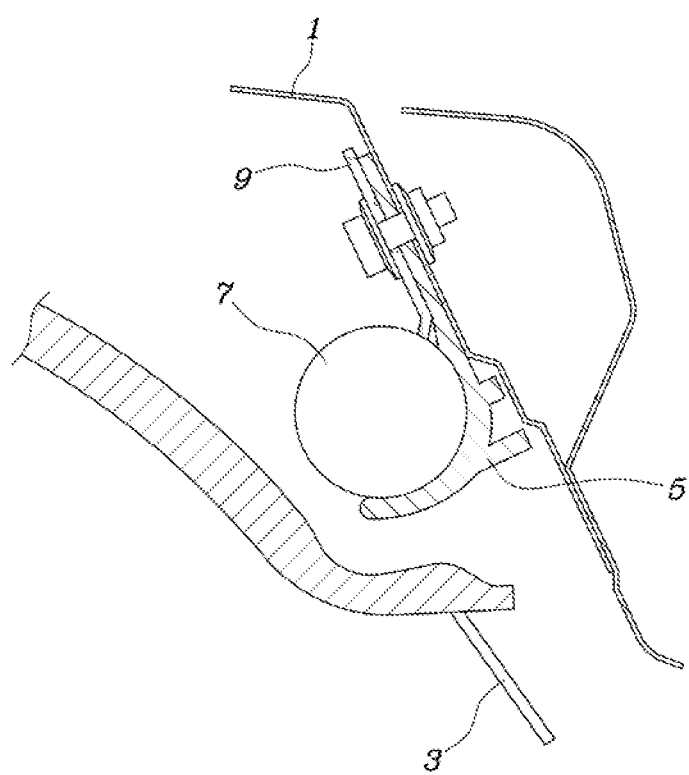
FIG. 1 is a view showing a structure of a curtain airbag to which a conventional ramp is applied.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment of the present invention will be described in detail with reference to accompanying drawings.

Figure 2:
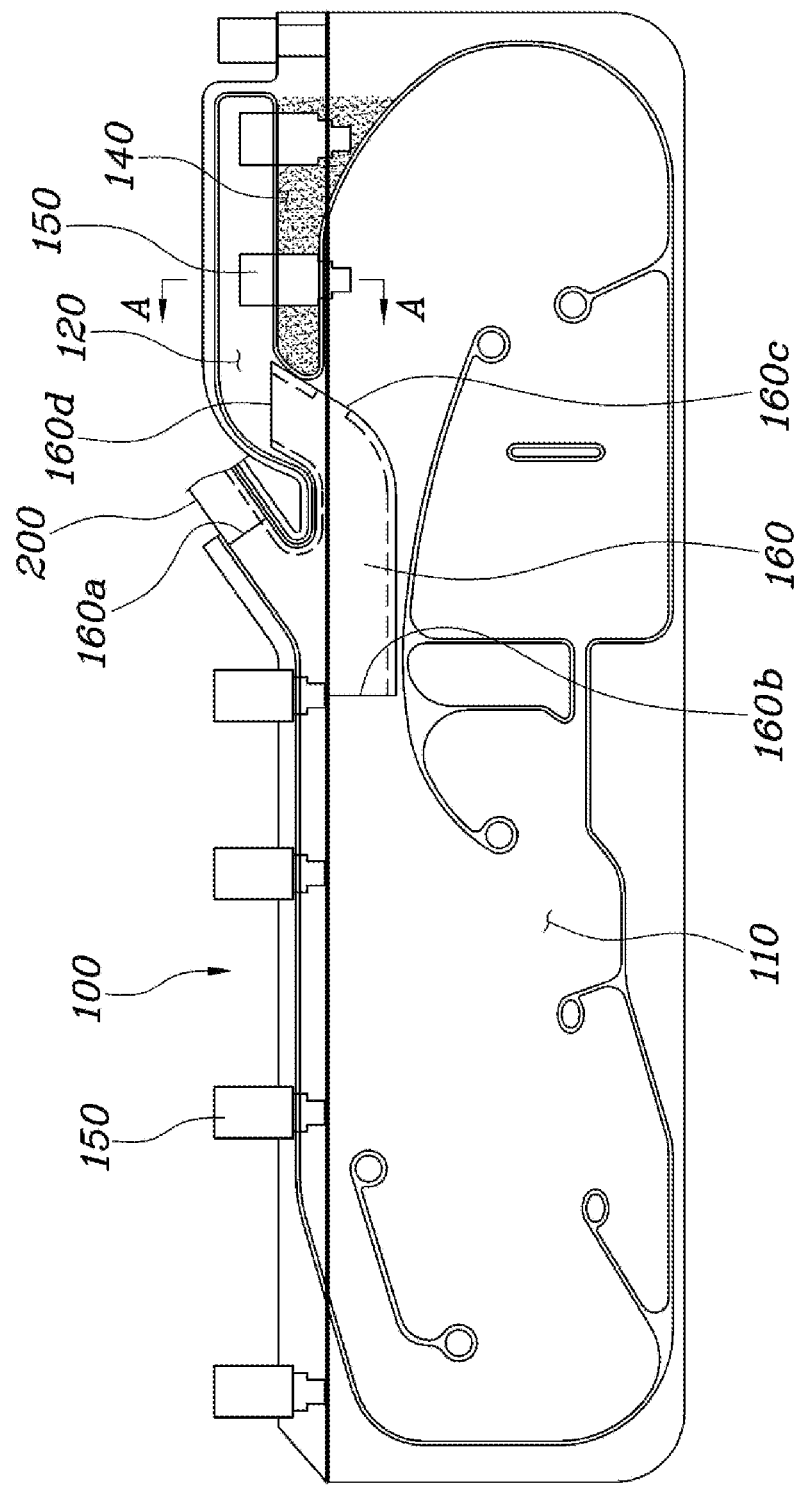
FIG. 2 is a view showing an airbag cushion according to the present invention in a deployed state.

FIG. 1 is a view showing a structure of a curtain airbag to which a conventional ramp is applied, and FIG. 2 is a view showing an airbag cushion according to the present invention in a deployed state.

Describing a curtain airbag applied to the present invention, an airbag cushion 100 of the curtain airbag is provided at an upper end inside a door of a vehicle along a front row and a rear row, and has a shape of being rolled into a roll shape.

In addition, a lower end of a mounting tab 150, which is partially formed of a fabric material (e.g., cotton), is fixed in a longitudinal direction of the airbag cushion 100, and an upper end of the mounting tab 150 is fixed to a vehicle body 300, so that the airbag cushion 100 is fixed to the vehicle body 300.

At this point, the mounting tab 150 may be sewn to the airbag cushion 100, or may be integrally formed with the airbag cushion 100.

Furthermore, among an entire longitudinal section of the airbag cushion 100, an inflator 200 is installed at an intermediate portion of the airbag cushion 100, the inflator 200 is connected to a diffuser 160 of the airbag cushion 100, so that gas discharged from the inflator 200 may be introduced into the airbag cushion 100 through the diffuser 160.

Figure 3:
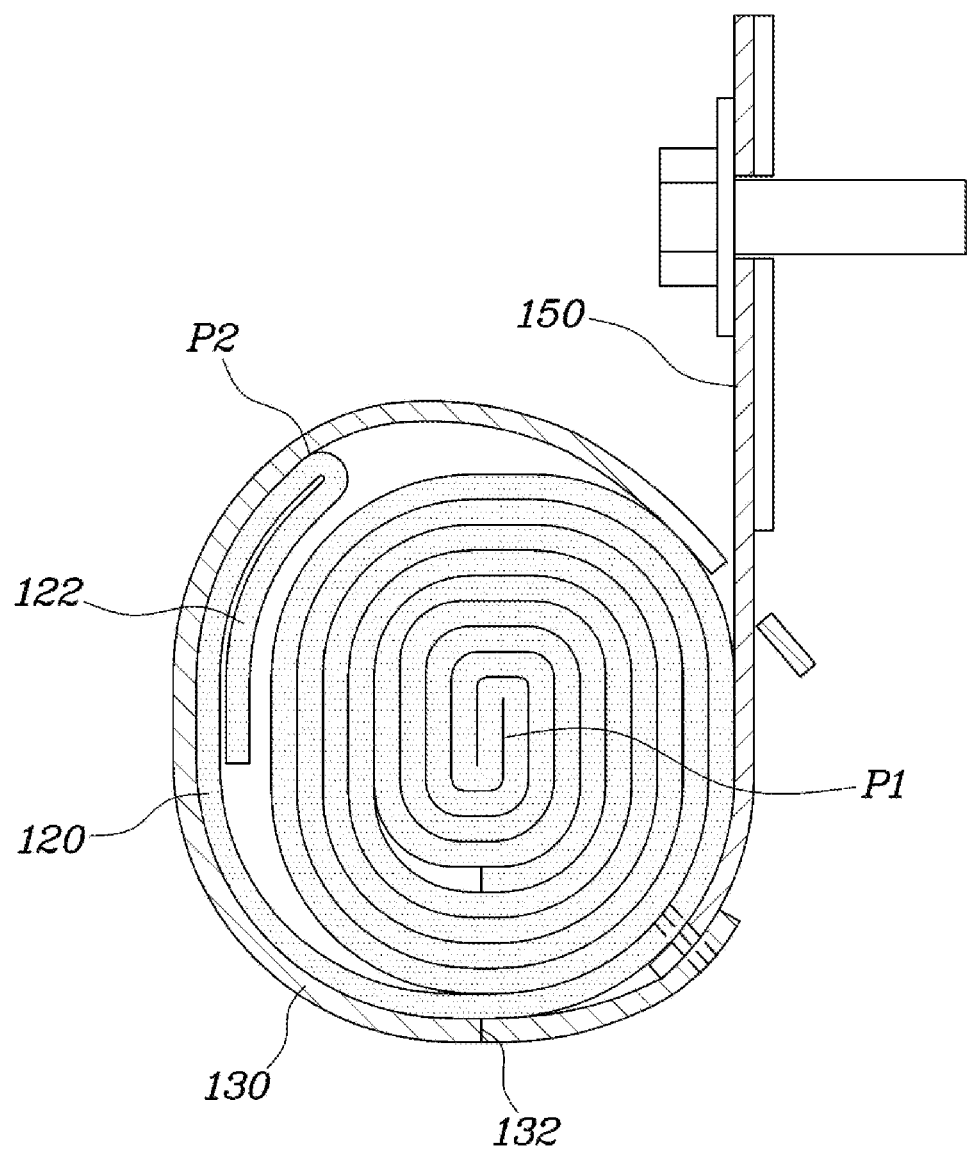
FIG. 3 is a view showing a structure of the airbag cushion folded toward the center of a vehicle according to a first embodiment of the present invention.

Meanwhile, FIG. 2 is a view showing the airbag cushion 100 according to the present invention in a deployed state. FIG. 3 is a view showing a structure of the airbag cushion 100 folded toward the center of the vehicle according to a first embodiment of the present invention.

Referring to the drawings, the present disclosure includes: a main chamber 110 of the airbag cushion 100 fixed to an upper end inside the vehicle body 300 and configured to be deployed downward; a sub chamber 120 of the airbag cushion 100 configured to be deployed from an upper portion of a pillar trim 400 located inside the vehicle body 300 and to allow the main chamber 110 to move toward the central region or center space of the vehicle; and a cushion cover 130 configured to cover the main chamber 110 and the sub chamber 120 while being folded. The main chamber 110 and the sub chamber 120 are folded with an upper end P2 of the sub chamber 120 located higher than a folding center P1 of the main chamber 110.

Specifically, the curtain airbag of the present invention is configured to deploy the sub chamber 120 prior to the main chamber 110.

In detail, the pillar trim 400 may be a trim member provided inside a B pillar and a C pillar in a vertically longitudinal direction, and the sub chamber 120 may be located at a portion of the pillar trim 400 of the C pillar.

In addition, a first end of the cushion cover 130 is fixed to the lower end of the mounting tab 150, and a second end of the cushion cover 130 is caught by an intermediate portion of the mounting tab 150 while covering both of the main chamber 110 and the sub chamber 120. A tear line 132 is formed at the lower end of the cushion cover 130, so that the airbag cushion 100 may be deployed by tearing the tear line 132 out.

In other words, when the airbag cushion 100 is deployed, the gas is injected into the sub chamber 120 by the inflator 200, so that the sub chamber 120 expands with a predetermined volume at an upper portion of the pillar trim 400 of the C pillar. Therefore, as the sub chamber 120 quickly pushes the main chamber 110 from an inner surface of the vehicle body 300 toward the central region of the vehicle, the main chamber 110 is downwardly deployed without interference with the pillar trim 400 of the C pillar.

Therefore, the deployment performance of the airbag cushion 100 is improved and, specifically, since a conventional ramp structure for deploying the airbag cushion 100 while avoiding the pillar trim 400 is unnecessary, the cost of the curtain airbag module is reduced and the work man-hours for assembly of the ramp is prevented from increasing.

Furthermore, since the uppermost end P2 of the sub chamber 120 is located higher than at least the folding center P1 of the main chamber 110, in a structure in which the sub chamber 120 is folded toward the central region of the vehicle, the sub chamber 120 is deployed at an upper end of the pillar trim 400 to prevent the main chamber 110 from interfering with the pillar trim 400, and in a structure in which the sub chamber 120 is folded toward the vehicle body 300, in a process in which the sub chamber 120 pushes the vehicle body 300 and is deployed, the main chamber 110 is definitely pushed toward the central region of the vehicle, thereby preventing the main chamber 110 from interfering with the pillar trim 400.

In addition, in the present invention, in order to deploy the sub chamber 120 prior to the main chamber 110, the shape of the diffuser 160 may be regulated.

Referring to FIG. 2, according to the present invention, the diffuser 160 is fixed to an inside portion of the airbag cushion 100; and the inflator 200 is connected to an inlet 160a of the diffuser 160 and the gas introduced thereinto; and outlets of the diffuser 160 are respectively arranged at the main chamber 110 and the sub chamber 120 so that the gas introduced into the diffuser 160 may be distributed into the main chamber 110 and the sub chamber 120.

For example, the diffuser 160 is formed by being sewn inside the airbag cushion 100, and when the gas is introduced into the diffuser 160 from the inflator 200, the diffuser 160 serves to distribute the gas into each chamber of the airbag cushion 100.

To this end, the diffuser 160 includes the inlet 160a connected to the inflator 200 and through which the gas is introduced, and a plurality of outlets to discharge the gas into both of the main chamber 110 and the sub chamber 120.

Specifically, the inlet 160a of the diffuser 160 is connected to a first main outlet 160b formed at the main chamber 110; and the first main outlet 160b may be connected to and distributed into a sub outlet 160d formed at the sub chamber 120 and a second main outlet 160c formed at the main chamber 110.

For example, the first main outlet 160b is formed at a first end formed to be downwardly inclined from the inlet 160a of the diffuser 160 toward the main chamber 110, and the first main outlet 160b is formed inside the main chamber 110 and to face a front end.

In addition, a second portion of the diffuser 160, the second portion facing the first main outlet 160b, extends toward a rear end of the main chamber 110, and at an extending end of the diffuser 160, the second main outlet 160c and the sub outlet 160d are respectively branched toward the rear end of the main chamber 110 and the sub chamber 120.

According to the above configuration, when the gas of the inflator 200 is introduced into the inlet 160a of the diffuser 160, the gas introduced into the inlet 160a of the diffuser 160 is distributed through the first main outlet 160b located at a front end of the diffuser 160, so that the gas is introduced into the front end of the main chamber 110.

In addition, as the gas distributed toward the first main outlet 160b is distributed into the second main outlet 160c located at a rear end of the diffuser 160 and the sub outlet 160d so as to allow the gas to be introduced into the sub chamber 120 and the rear end of the main chamber 110, the gas introduced into the diffuser 160 is supplied into both of the main chamber 110 and the sub chamber 120.

However, the gas is distributed through both of the second main outlet 160c and the sub outlet 160d, but since the sub chamber 120 has a volume smaller than a volume of the main chamber 110, the sub chamber 120 expands and is deployed more quickly than the main chamber 110.

Figure 4:
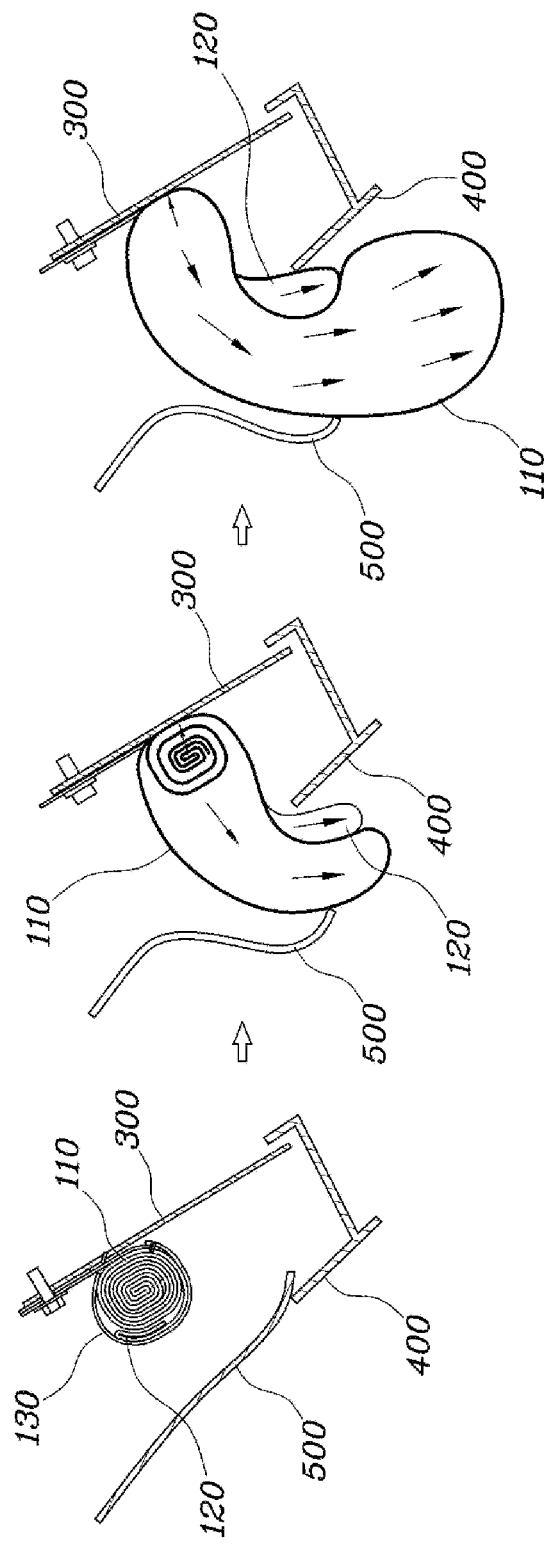
FIG. 4 is a view showing a deployment process of the airbag cushion with the folding structure according to the first embodiment on the basis of line A-A in FIG. 2.
Figure 6:
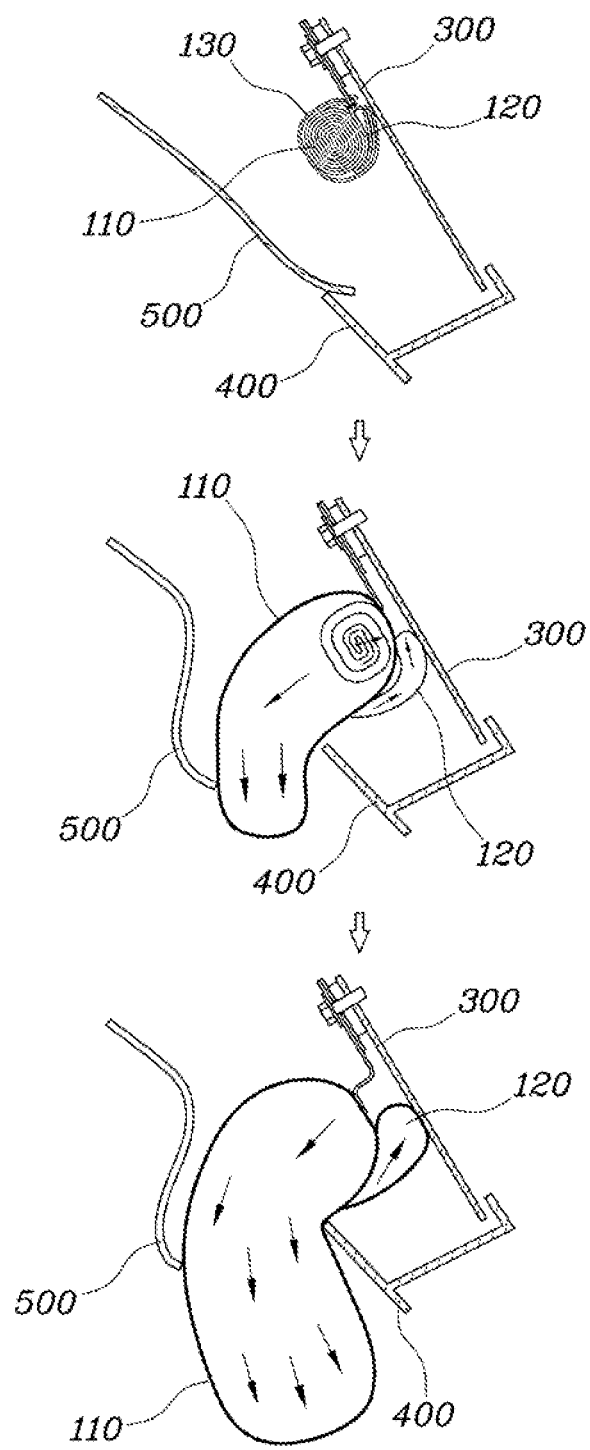
FIG. 6 is a view showing a deployment process of the airbag cushion with the folding structure according to the second embodiment on the basis of line A-A in FIG. 2.

Meanwhile, describing in detail the structure of the sub chamber 120 with reference to FIGS. 2, 4, and 6, the sub chamber 120 is formed in a longitudinal direction of the main chamber 110, and as a first end thereof is formed to communicate with an edge of the main chamber 110, the sub chamber 120 has a passage shape with a closed second end.

In other words, the sub chamber 120 is deployed with the passage shape formed at the upper end of the main chamber 110 in a front-rear longitudinal direction of the airbag cushion 100, and when the sub chamber 120 is deployed, the sub chamber 120 pushes the main chamber 110 toward a headlining 500.

Furthermore, as the sub chamber 120 communicates with the main chamber 110 through the diffuser 160, the gas introduced into the main chamber 110 is supplied into the sub chamber 120.

In addition, as shown in FIG. 2, the present invention includes a peninsula area 140 of a predetermined area prevented from being filled with the gas that is located between the sub chamber 120 and the main chamber 110 facing the sub chamber 120.

Furthermore, the peninsula area 140 may have a shape of which a remaining edge excluding one portion thereof is surrounded by an edge of the sub chamber 120 and an edge of the main chamber 110.

In other words, the peninsula area 140 may be formed in a portion dividing the main chamber 110 and the sub chamber 120 from each other, and with the adjustment in an area of the peninsula area 140, the adjustment in a sectional area of the sub chamber 120 is possible, so that a flow rate of the gas introduced into the sub chamber 120 can be adjusted.

Furthermore, in the present invention, a first end of the mounting tab 150 is fixed to the vehicle body 300; and a second end of the mounting tab 150 may be fixed to a portion between the main chamber 110 and the sub chamber 120.

For example, the lower end of the mounting tab 150 is fixed to the peninsula area 140 located between the main chamber 110 and the sub chamber 120. Therefore, as an area of the peninsula area 140 is adjusted and a fixed location of the mounting tab 150 in the peninsula area 140 is adjusted, a deployed location of the sub chamber 120 can be tuned.

Meanwhile, FIG. 3 is a view showing the structure of the airbag cushion 100 folded toward the central region of the vehicle according to the first embodiment of the present invention. FIG. 4 shows a deployment process of the airbag cushion 100 with the folding structure according to the first embodiment on the basis of line A-A in FIG. 2.

Referring to the drawings, as shown in FIG. 4, the sub chamber 120 is deployed between the upper end of the pillar trim 400 and the main chamber 110 while pushing the main chamber 110 toward the central region of the vehicle, thereby preventing the main chamber 110 from being caught by the upper end of the pillar trim 400.

For the above-described deployed shape of the airbag cushion 100, as shown in FIG. 3, the main chamber 110 is folded into a roll shape; and the sub chamber 120 may be folded into the shape of covering the main chamber 110 from the lower end of the main chamber 110 toward the central region of the vehicle.

At this point, a folded portion 122 formed at an end portion of the sub chamber 120 may be folded toward the main chamber 110.

In other words, based on the folded states of the main chamber 110 and the sub chamber 120, a first end of the sub chamber 120 is sewn at the lower end of the mounting tab 150, and a portion where the first end of the sub chamber 120 is connected to a second end thereof is directed toward the headliner at the central region of the vehicle.

Accordingly, as shown in FIG. 4, in deploying the airbag, as the gas is filled into the sub chamber 120, the sub chamber 120 is released toward the headlining 500 to secure the thickness thereof and expand, and the expanding sub chamber 120 is placed on the upper end of the pillar trim 400 of the C pillar and is unfolded.

Therefore, as the sub chamber 120 has a self-support stiffness, the main chamber 110 is pushed by the sub chamber 120 and the main chamber 110 is downwardly deployed between the sub chamber 120 and the headlining 500 beyond the upper portion of the sub chamber 120, so that the main chamber 110 is prevented from interfering with the pillar trim 400.

Figure 5:
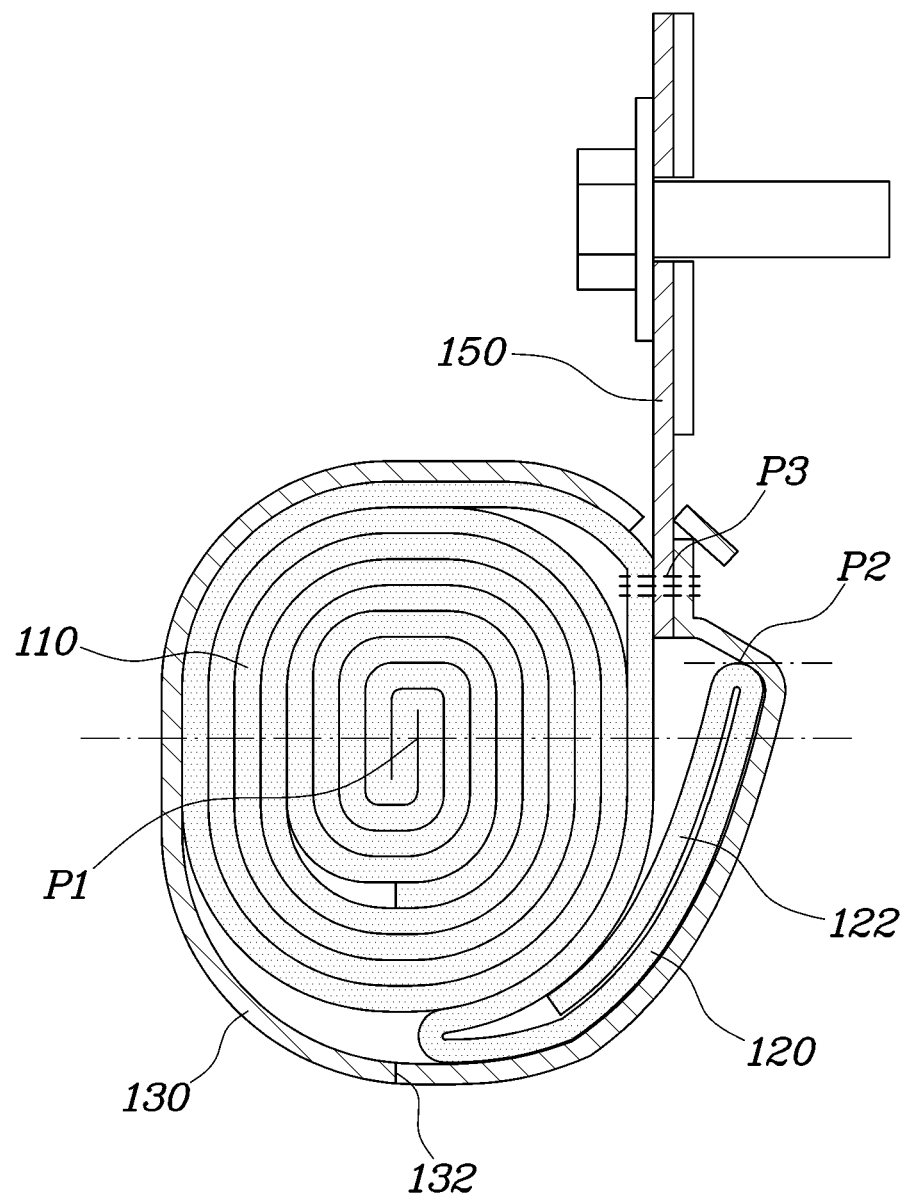
FIG. 5 is a view showing a structure of the airbag cushion folded toward an inside portion of a vehicle body according to a second embodiment of the present invention.

Meanwhile, FIG. 5 is a view showing the structure of the airbag cushion 100 folded toward the inside portion of the vehicle body 300 according to a second embodiment of the present invention. FIG. 6 is a view showing a deployment process of the airbag cushion 100 with the folding structure according to the second embodiment on the basis of line A-A in FIG. 2.

Figure 7:
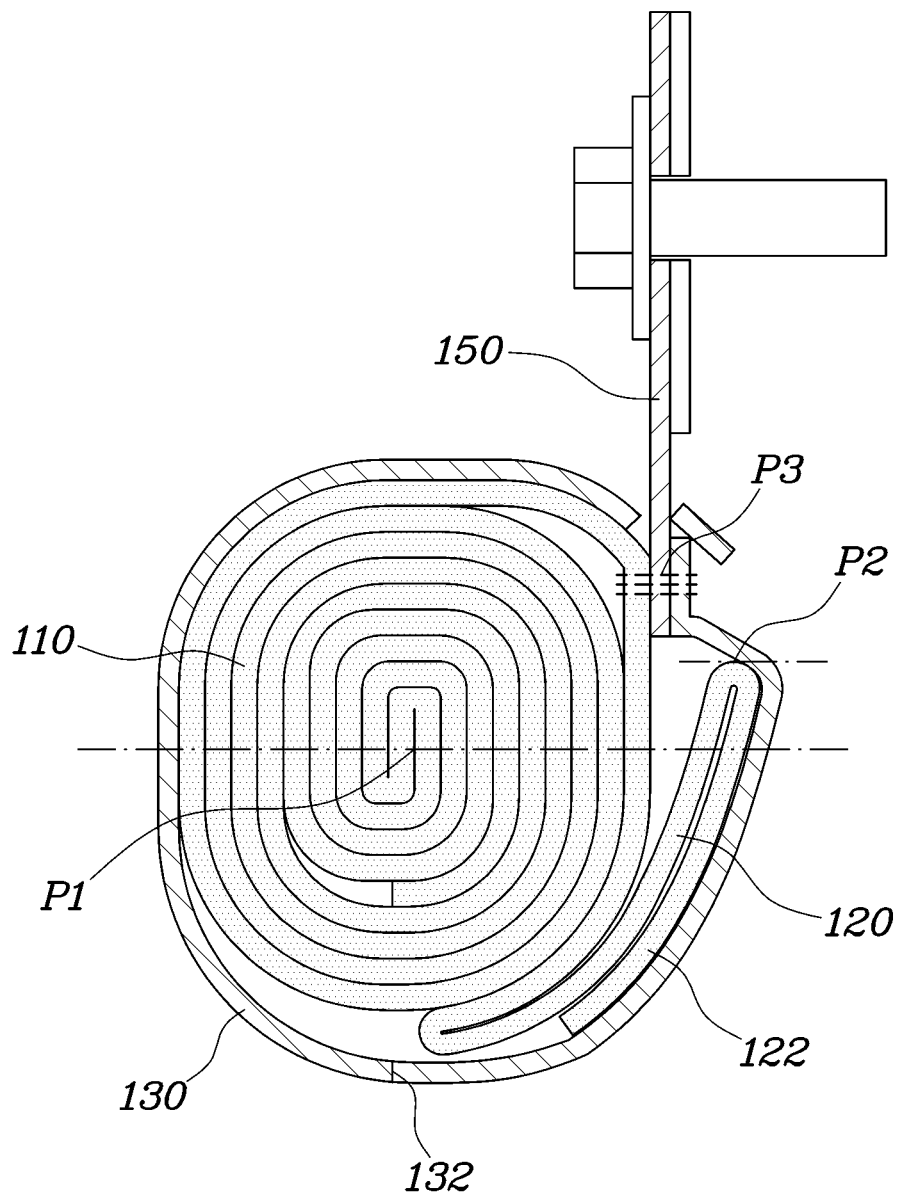
FIG. 7 is a view showing a structure of the airbag cushion folded toward the inside portion of the vehicle body according to a third embodiment of the present invention.
Figure 8:
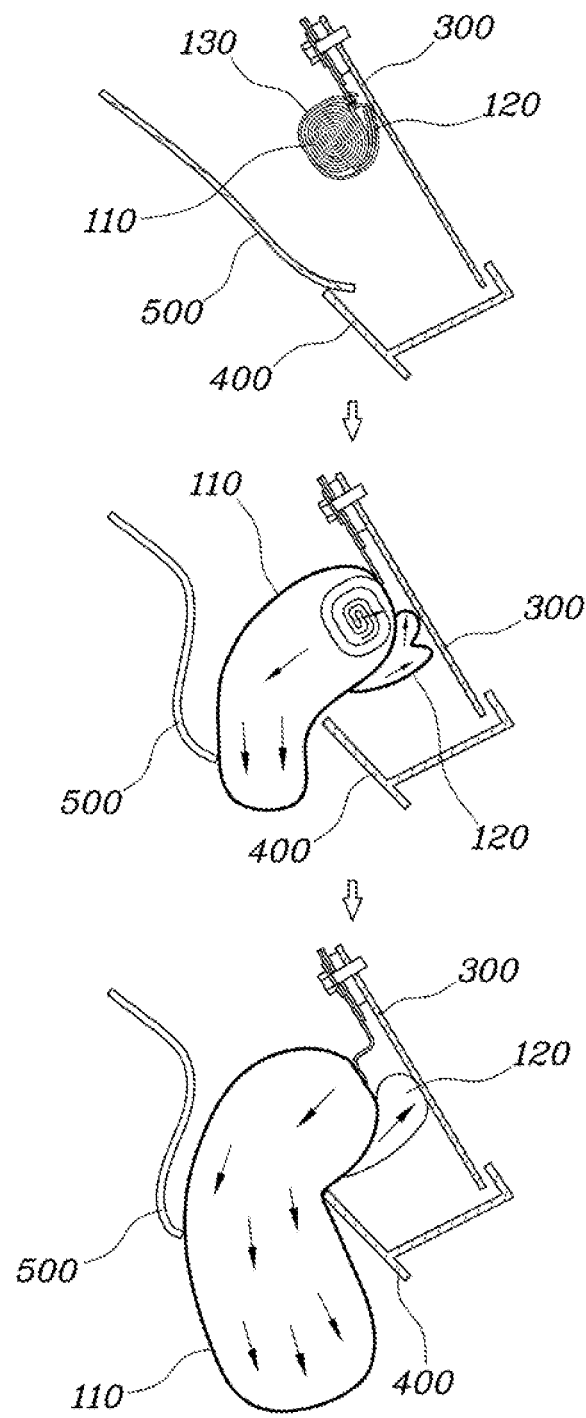
FIG. 8 is a view showing a deployment process of the airbag cushion with the folding structure according to the third embodiment on the basis of line A-A in FIG. 2.

FIG. 7 is a view showing the structure of the airbag cushion 100 folded toward the inside portion of the vehicle body 300 according to a third embodiment of the present invention. FIG. 8 is a view showing a deployment process of the airbag cushion 100 with the folding structure according to the third embodiment on the basis of line A-A in FIG. 2.

Referring to the drawings, the sub chamber 120 is deployed toward the central region of the vehicle while pushing the inside portion of the vehicle body 300, so that the main chamber 110 is prevented from being caught by the upper end of the pillar trim 400.

For the above-described deployed shape of the airbag cushion 100, the main chamber 110 is folded into a roll shape; and the sub chamber 120 is folded into the shape of covering the main chamber 110 from the lower end of the main chamber 110 toward the inside portion of the vehicle body 300.

At this point, as shown in FIG. 5, the folded portion 122 formed at the end portion of the sub chamber 120 may be folded toward the main chamber 110.

Furthermore, as shown in FIG. 7, the folded portion 122 formed on the end portion of the sub chamber 120 may be folded toward the inside portion of the vehicle body 300.

In other words, based on the folded states of the main chamber 110 and the sub chamber 120, the first end of the sub chamber 120 is sewn at the lower end of the mounting tab 150, and the portion where the first end of the sub chamber 120 is connected to the second end thereof is directed toward the vehicle body 300.

Accordingly, as shown in FIGS. 6 and 8, when the airbag is deployed, the gas is filled into the sub chamber 120 and the sub chamber 120 expands between the vehicle body 300 and the main chamber 110 while securing the thickness thereof, and the expanding sub chamber 120 is deployed while pushing the vehicle body 300.

Therefore, as the sub chamber 120 has the self-support stiffness, the main chamber 110 is pushed by the sub chamber 120 toward the central region of the vehicle and the main chamber 110 is downwardly deployed between the sub chamber 120 and the headlining 500 beyond the upper portion of the pillar trim 400, so that the main chamber 110 is prevented from interfering with the pillar trim 400.

In addition, in the folding structure shown in FIGS. 5 and 7, the airbag cushion may be folded with a fixed part P3 between the mounting tab 150 and the airbag cushion 100 located higher than the folding center P1 of the main chamber 110.

At this point, the mounting tab 150 and the airbag cushion 100 may be fixed to each other by sewing.

Hereinbelow, referring to FIGS. 2 and 4, deployment operation of the curtain airbag according to the present invention will be described.

When a collision signal of the vehicle is detected and the inflator 200 explodes, the gas supplied from the inflator 200 is introduced into the airbag cushion 100 via the inlet 160a of the diffuser 160.

Therefore, when the gas introduced via the diffuser 160 is introduced into the front end of the main chamber 110, the gas is introduced into the sub chamber 120 and the rear end of the main chamber 110 and the sub chamber 120 is deployed preferentially.

Then, the sub chamber 120 expands and is deployed while being placed on the pillar trim 400 of the C pillar, thereby pushing the main chamber 110 toward the headlining 500.

Therefore, the main chamber 110 is deployed downward between the headlining 500 and the sub chamber 120, so that the main chamber 110 is deployed downward without interfering with the pillar trim 400 of the C pillar.

Referring to FIGS. 2, 6, and 8, another deployment operation of the curtain airbag according to the present invention will be described.

When a collision signal of the vehicle is detected and the inflator 200 explodes, the gas supplied from the inflator 200 is introduced into the airbag cushion 100 via the inlet 160a of the diffuser 160.

Therefore, when the gas introduced via the diffuser 160 is introduced into the front end of the main chamber 110, the gas is introduced into the sub chamber 120 and the rear end of the main chamber 110 and the sub chamber 120 is deployed preferentially.

Then, the sub chamber 120 expands with a predetermined volume at the upper portion of the pillar trim 400 of the C pillar, so that the sub chamber 120 quickly pushes the main chamber 110 from the inner surface of the vehicle body 300 toward the central region of the vehicle.

Therefore, the main chamber 110 is deployed downward between the headlining 500 and the sub chamber 120 beyond the pillar trim 400, so that the main chamber 110 is deployed downward without interfering with the pillar trim 400 of the C pillar.

As described above, the present invention is configured to improve the deployment performance of the airbag cushion 100 with the sub chamber 120 and, specifically, since the conventional ramp structure for deploying the airbag cushion 100 while avoiding the pillar trim 400 is unnecessary, the cost of the curtain airbag module is reduced and the work man-hours for assembly of the ramp is prevented from increasing.

Furthermore, since the uppermost end P2 of the sub chamber 120 is located higher than the folding center P1 of the main chamber 110, in the structure in which the sub chamber 120 is folded toward the central region of the vehicle, the sub chamber 120 is deployed at the upper end of the pillar trim 400 to prevent the main chamber 110 from interfering with the pillar trim 400, and in the structure in which the sub chamber 120 is folded toward the vehicle body 300, in a process in which the sub chamber 120 pushes the vehicle body 300 and is deployed, the main chamber 110 is definitely pushed toward the central region of the vehicle, thereby preventing the main chamber 110 from interfering with the pillar trim 400.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. A curtain airbag comprising:
   an airbag cushion having (1) a main chamber fixed to an upper end thereof inside a vehicle body and configured to be deployed downward and (2) a sub chamber configured to be deployed from an upper portion of a pillar trim located inside the vehicle body and to allow the main chamber to move toward a central region of the vehicle body;
   a cushion cover configured to cover the main chamber and the sub chamber while being folded; and
   a mounting tab, a first end of which is fixed to the vehicle body and a second end of which is fixed to the cushion cover,
   wherein a portion of the sub chamber is located between the cushion cover and the main chamber so that the portion of the sub chamber is in contact with and covers a portion of the main chamber when the main chamber and the sub chamber are folded and covered by the cushion cover, and
   wherein the sub chamber is folded with an upper end thereof located higher than a folding center of the main chamber.

2. The curtain airbag of claim 1, wherein the sub chamber is configured to be deployed prior to the main chamber.

3. The curtain airbag of claim 1, including:
   a diffuser fixed to an inside portion of the airbag cushion; and
   an inflator connected to an inlet of the diffuser to introduce gas to the airbag cushion,
   wherein outlets of the diffuser are respectively arranged at the main chamber and the sub chamber, so that the gas introduced into the diffuser is distributed to both the main chamber and the sub chamber.

4. The curtain airbag of claim 3, wherein the inlet of the diffuser is connected to a first main outlet formed in the main chamber; and
   the first main outlet is connected to a sub outlet formed in the sub chamber and a second main outlet formed in the main chamber.

5. The curtain airbag of claim 1, wherein the sub chamber is formed in a longitudinal direction of the main chamber and into a passage having a first end arranged to communicate with an edge of the main chamber and a second end closed.

6. The curtain airbag of claim 1, wherein a peninsula area of a predetermined area prevented from being filled with gas is located between the sub chamber and the main chamber facing the sub chamber; and
   the peninsula area is formed into a shape of which a remaining edge excluding one portion is surrounded by an edge of the sub chamber and an edge of the main chamber.

7. The curtain airbag of claim 6, wherein the peninsula area is configured to be adjustable so that adjusting the peninsula area adjusts a flow rate of gas into the sub chamber.

8. The curtain airbag of claim 1, wherein the sub chamber is configured to be deployed between an upper end of the pillar trim and the main chamber while pushing the main chamber toward a central region of the vehicle, so that the main chamber is prevented from being caught by the upper end of the pillar trim.

9. The curtain airbag of claim 8, wherein the main chamber is configured to be folded into a roll shape; and
   the sub chamber is configured to be folded to surround the main chamber at a lower end of the main chamber toward the central region of the vehicle.

10. The curtain airbag of claim 9, wherein an end of the sub chamber is configured to be folded toward the main chamber.

11. The curtain airbag of claim 1, wherein the sub chamber is configured to be deployed toward the central region of the vehicle body while pushing an inside portion of the vehicle body, so that the main chamber is prevented from being caught by an upper end of the pillar trim.

12. The curtain airbag of claim 11, wherein the main chamber is configured to be folded into a roll shape; and the sub chamber is configured to be folded for surrounding the main chamber from a lower end of the main chamber toward the inside portion of the vehicle body.

13. The curtain airbag of claim 12, wherein an end of the sub chamber is configured to be folded toward the main chamber.

14. The curtain airbag of claim 12, wherein an end of the sub chamber is configured to be folded toward the inside portion of the vehicle body.

15. The curtain airbag of claim 12, wherein a fixed portion between the mounting tab and the airbag cushion is located higher than a folding center of the main chamber when the curtain airbag is folded.

16. The curtain airbag of claim 1, wherein the cushion cover includes a tear line formed at a lower end of the cushion cover configured to tear the cushion cover away from the mounting tab when the curtain airbag is deployed.

\* \* \* \* \*